April 9, 1957 R. F. GRAEFNITZ 2,788,488
METHOD OF PHASING WATTHOUR METERS AND APPARATUS
Filed June 6, 1955 2 Sheets-Sheet 1

INVENTOR.
Russell F. Graefnitz
BY
Louis Robertson Atty.

INVENTOR.
Russell F. Graefnitz.
BY
Louis Robertson
Atty.

United States Patent Office 2,788,488
Patented Apr. 9, 1957

2,788,488

METHOD OF PHASING WATTHOUR METERS AND APPARATUS

Russell F. Graefnitz, Lafayette, Ind., assignor, by mesne assignments, to Duncan Electric Company, Inc., Lafayette, Ind., a corporation of Indiana Application June 6, 1955, Serial No. 513,326

14 Claims. (Cl. 324—74)

The accuracy of alternating current watthour meters, such as the ordinary electricity meter in the home, depends in part on the accuracy of the phasing of such meters. The disks of such meters are driven by the inductive interaction between the disk and two electromagnets. One of these magnets is energized by the potential coil, which may be said to measure the voltage of the circuit being measured. The other of the electromagnets is energized by a current coil, which may be said to measure the current in the circuit being measured. The magnetism emanating from each electromagnet is an alternating magnetism. As the current passing through the energizing coils constantly reverses, so the magnetism emanating from these magnets constantly reverses. The phasing of a meter refers to the timing of the maximums of magnetism emanating from the current magnet with respect to the maximums of magnetism emanating from the voltage magnet. Unless this phasing or relative timing between the magnetisms properly reflects the relative timing in fact existing between the maximums of current values and potential values in the circuit being measured, inaccuracy of the meter will result.

According to conventional practice, watthour meters are provided with phasing coils. Such a coil comprises one or more turns of wire around the magnetic core of one of the coils, usually the current coil, and a means for adjusting the resistance in a closed circuit comprising this phasing coil. A most inexpensive method of adjusting the resistance is to form one of the leads of the phasing coil of resistance wire, twisting it together with the other lead in such manner that the effective length of the resistance wire in the circuit can be varied as by untwisting it to increase the length and therefore the resistance, until it has the correct resistance value for producing the right phasing effect. The twisted end is called a pigtail, and it is usually soldered. This phasing adjustment is one of the first adjustments made in adjusting or calibrating a meter, after it has been assembled, to make it accurate.

According to the present invention, an improved method and apparatus have been provided for making the phasing adjustments. According to this invention, as before, the phasing adjustment is made at zero power factor. This means that the maximum current value occurs midway between two maximums of voltage. This condition can also be described by saying that the current and voltage are 90° out of phase. If a circuit is operating at zero power factor, there is no power consumption and the disk of the meter measuring this circuit should stand still, even if there is considerable current flow. Of course, it is extremely rare for this condition to be encountered in a circuit during normal operation. In fact, normal operation is often thought of as the opposite condition, namely, one spoken of as "unity" power factor, in which the maximums of current values occur exactly simultaneously with the maximums of voltage values. A circuit having only resistance loads, such as light bulbs, would operate approximately at unity power factor, but motors in a circuit tend to shift its power factor away from unity.

An advantage of adjusting the phasing of a meter at zero power factor is the ease with which correctness of adjustment can be observed or determined. If the meter disk moves at all while the power factor applied to it is zero, the phasing adjustment is not correct. There is, however, a practical difficulty of being sure that the power factor of the circuit applied to the meter is truly zero. According to the present invention, even this difficulty is overcome. This is accomplished by utilizing any movement of a meter under test to shift the power factor of the special energizing circuit which energizes this meter, until the disk no longer moves, and adjusting the phasing pigtail on the meter under test until a standard watt meter subject to the same energizing circuit indicates zero, thereby showing that the energizing circuit is operating at zero power factor. The circuit whereby the meter under test controls the power factor of the energizing circuit is one feature of the present invention, but any attempt to describe it briefly in this introduction would probably not be intelligible.

Additional objects and advantages of the invention will be apparent from the following description and from the drawings.

Designation of figures

General description

Although the law requires a full and exact description of at least one form of the invention, such as that which follows, it is, of course, one purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

Figures 1, 1A:
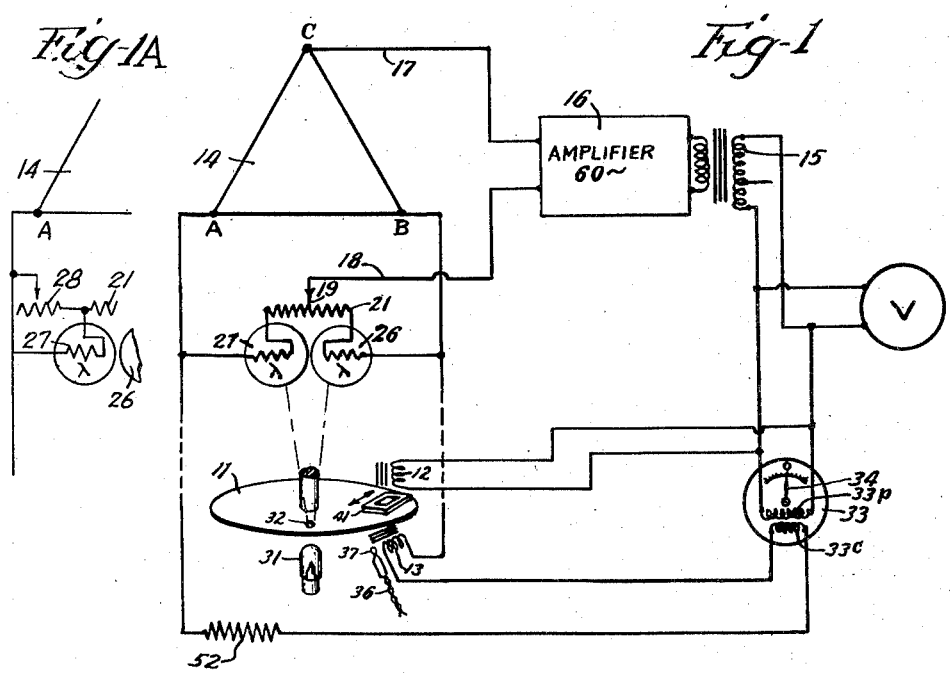
Fig. 1 is a schematic diagram indicating a meter under test in a circuit of this invention as arranged for the phasing operation.
Fig. 1A is a fragmentary, schematic diagram corresponding to a portion of Fig. 1, but showing a modification.
Figure 2:
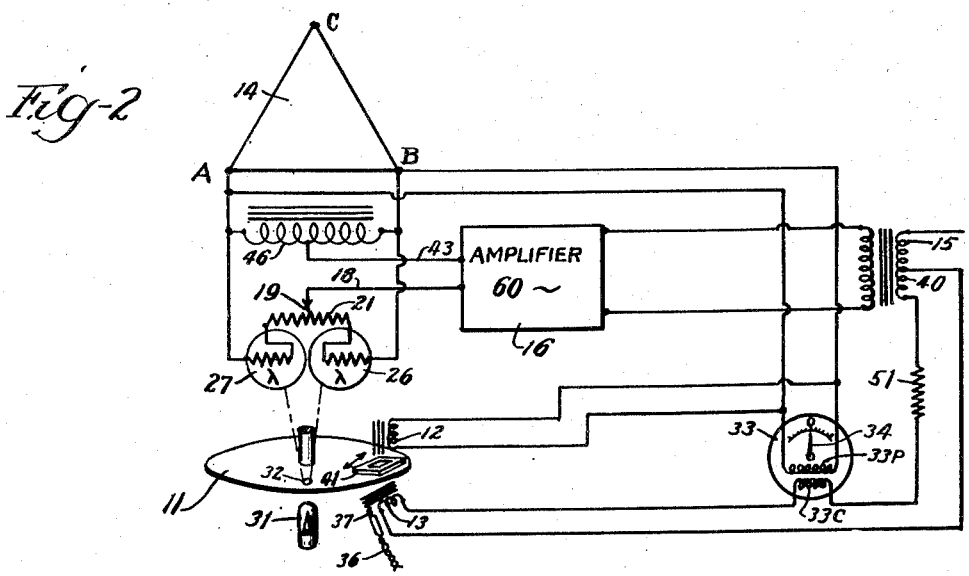
Fig. 2 is a similar schematic diagram with the circuit arranged for a preliminary adjustment of the meter under test in which the tendency of the potential coil to cause the disk to creep is removed.
Figure 3:
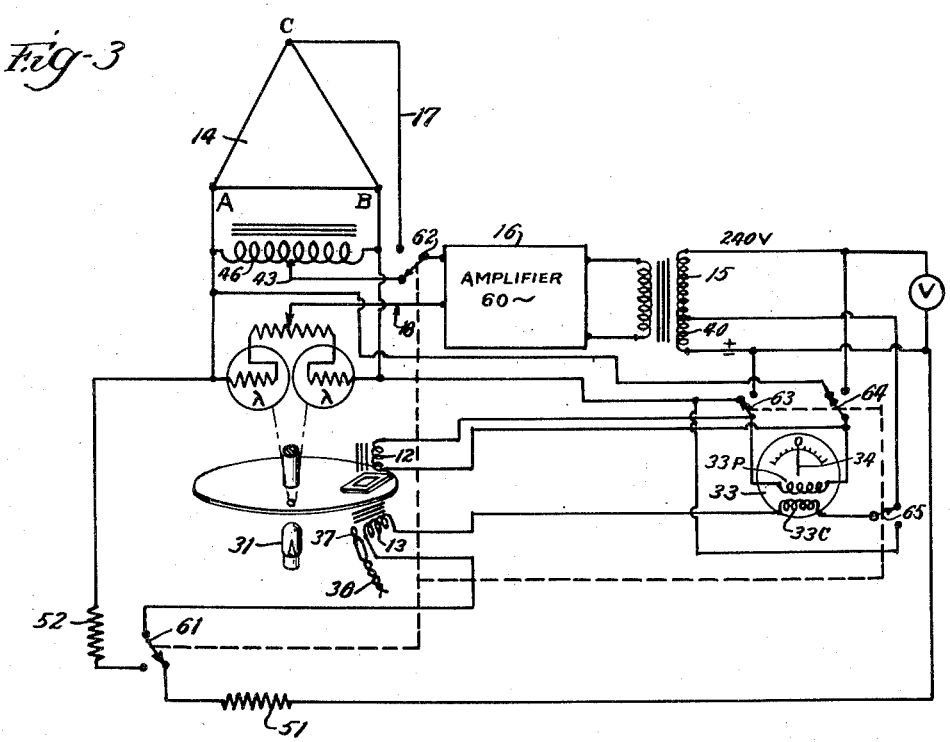
Fig. 3 is a similar schematic diagram of an apparatus including switches and which is adapted to be changed from the circuit arrangement of Fig. 1 to the circuit arrangement of Fig. 2.

Although the apparatus of this invention is most likely to be built as illustrated in Fig. 3, the switching arrangement therein will provide a choice between the circuit of Fig. 1 and the circuit of Fig. 2. For the most part, the description will be most easily understood if Figs. 1 and 2 are separately described. Fig. 1 is described first, because it represents the ultimate purpose of the invention.

The phasing circuit

In Fig. 1, the meter to be calibrated is represented by disk 11, the voltage coil 12, the current coil 13 and its associated parts. The current coil 13 is connected across phase A—B of a three-phase delta power supply 14. The potential coil 12 is energized by the output coil 15 of amplifier 16. The energization of potential coil 12 should be approximately 90° out of phase with the energization of current coil 13 and the relationship should be adjustable for reasons which will be apparent from the remainder of this description. The output circuit of amplifier 16 would have approximately this required 90° phase displacement from phase A—B if the input of amplifier 16 were connected across the delta source from point C, representing the third wire, to a midpoint in a resistance connected across the phase A—B. In Fig. 1, amplifier 16 is connected in that manner, except for adjustability features. Thus, in Fig. 1 it is easily seen that one lead 17 of the input to amplifier 16 is connected to point C of the three-phase delta source. The other lead 18 is connected to a variable tap or sliding contact 19 of a resistor 21, which comprises part of a resistance system connected across the phase A—B.

The resistance system across the phase A—B includes, in addition to resistor 21, a pair of photoresistors 26 and 27. The adjustable biasing resistor 28 (which may be added as shown in Fig. 1A) may be ignored for present considerations. Thus it is seen that photoresistor 27, resistor 21, and photoresistor 26 comprise a series reistance connected across phase A—B. The photoresistors 26 and 27 are of such nature that they have quite high resistance when they are not subjected to light, the resistance being lowered somewhat in proportion to the light to which they are subjected. Thus, it will be seen that while they are both subjected to the same dim general light comprising the illumination in the test room, their resistances will be approximately equal and the tap 19 will be connected approximately midway in the resistance system connected across phase A—B. Thus tap 19 will be energized approximately equally by points A and B of the three-phase source and the input of amplifier 16 will therefore be approximately 90° out of phase with the phase A—B. Variations in this phase relationship can be accomplished by sliding tap 19 to the right or left, so that the energization becomes more that of point B or more that of point A. With the same effect, the phasing can be somewhat changed by shifting the light more on either photoresistor 26 or photoresistor 27. When photoresistor 26 is more brightly illuminated than photoresistor 27, its resistance decreases, while photoresistor 27 resistance increases so that the effect is the same as if the contact 19 had been slid to the right, and the energization is more that of point B.

The photoresistors 26 and 27 are illuminated mainly by a beam of light from a light bulb 31 which, being focused if desired, passes through an anti-creep hole 32 in disk 11. The disk may be initially turned by hand until the anti-creep hole 32 is in the beam of the light. As soon as the beam strikes either one or the other photoresistor, depending on the direction the disk is rotated, the disk will pull to null between them. By "null" is meant a position of the anti-creep hole such that the disk no longer tends to move in either direction.

When a meter to be tested is first connected and the disk turned to let the light pass through the hole 32, there will be a tendency for the disk to rotate, unless the hole just happens to be in the null position. However, as soon as the disk 11 begins to move, it will instantly produce a changing in the phase displacement between the energization of potential coil 12 and potential coil 13. The circuit is degenerative or self-correcting: this change is in a direction tending to reduce and counteract the phasing error which caused the disk to move in the first place. With proper design, the disk will come to rest with the light beam shared between the two photoresistors. After the first meter has been tested and properly phased, the tap 19 will be adjusted to such a position that the light beam falls fairly equally on both of the photocells 26 and 27, and thereafter the tap 19 will not ordinarily need to be shifted. The voltmeter V can be provided to make sure the amplifier provides the proper voltage output for the particular meter tested.

When the disk of the meter under test comes to rest, this means that the relationship between the magnetism emanating from the potential coil 12 and that reaching the disk from the current coil 13 is at zero power factor. Usually at this stage, this zero power factor between the magnetisms will be the result of two errors correcting one another. The meter will not usually be inherently accurate initially, but its phase error will have been corrected or counteracted by an equal and opposite phase error purposely produced in the energizing circuits. In short, until the magnetisms are at zero power factor, the disk 11 will move until it finds the position at which its differential illumination of the photoresistors 26 and 27 produces a voltage having the proper phase position (applied through amplifier 16) necessary to counteract the phasing error within the meter.

The approximate extent of this circuit phasing error which was required to counteract or compensate for the phasing error within the meter is indicated by an indicator-type watt meter 33 having potential coil 33$p$ and current coil 33$c$. This watt meter is of the zero center type, so that the direction of the error in the meter which required compensation by error in the circuit can be determined by the direction of swing of the indicator needle 34 from the zero point.

When the operator has observed the direction of swing of needle 34, he will twist the pigtail 36 to lengthen or shorten the circuit of phasing coil 37 of the meter under test. As he does so, the indicator needle 34 will swing back toward zero. When it reaches zero, the phasing adjustment has been completed. The pigtail will preferably be soldered. Usually the adjustment is by progressively separating the soldered wires. As the pigtail 36 is untwisted, the meter disk 11 will move minutely so as to reduce the circuit phasing error, although the operator need pay no attention to the disk 11 and its movement may be barely detectable even by close scrutiny. When the indicator 34 reaches zero, this will result from the fact that the energizing circuits have reached zero power factor. In other words, the circuits will no longer include any phasing error for compensating the phasing error in the meter, which by then will have been corrected, also.

To speed preliminary automatic turning of the disk to align an aperture with the light beam, biasing resistor 28 may be provided, with a resistance high enough to be negligible in its effect when the light beams strike the photoresistors. Usually the operator will initially turn the disk by a finger, however.

Creep elimination

Before the tendency of the disk to rotate can accurately indicate the phasing between the associated potential and current coils, any tendency of this disk to rotate or creep under the influence of the potential coil alone must be eliminated. The tendency of a meter disk to creep usually results from the displacement of a light load plate 41. A light load plate conventionally comprises a loop of copper approximately centered about the main pole of the current coil 12 but adjustable in a circumferential direction to produce a torque or rotational force on the disk 11 by induction. In the later stages of meter calibrations, this light load plate will be carefully adjusted to provide just the right amount of torque to compensate for friction and analogous factors and provide the desired accuracy characteristics of the meter at light load (usually ten percent of "rated load"). Before making the phasing adjustment as above described, however, the light load plate should be moved to a neutral position, so that the disk will have no tendency to creep. The circuit arrangement shown in Fig. 2 facilitates the accurate elimination of creeping tendency by neutralizing the position of the light load plate 41.

As far as the operator is concerned, the operations will be the same in Fig. 2 as in Fig. 1, except that the operator will adjust the light load plate 41 instead of adjusting the pigtail 36. Thus the disk 11 will be turned, as by hand, until the hole 32 passes a beam of light to the photoresistors 26 and 27. The disk is then immediately taken under the control of the circuit and comes to rest. The operator observes whether indicator hand 34 has swung to the right or left, and moves light load plate 41 accordingly until indicator 34 swings back to the zero position. The operators will then operate a gang switch, as will be described, to transform the circuit to that shown in Fig. 1 and will proceed with the phasing operation already described.

The energization of the meter coils is in some respects quite different in Fig. 2 from that in Fig. 1. In Fig. 2, the energizing circuits are operating approximately at unity power factor instead of at zero power factor. The operation of the light beam on the photoresistors controls the direction and quantity of current in the current coils, and when the light load plate 41 has been properly adjusted, the current in the current coils will reach zero and the indicator needle 34 will indicate zero for that reason.

In Fig. 2 it will be observed that current coils instead of the potential coils are connected to the output of the amplifier 16. In this instance, the low voltage output coil 40 is used, this being only a small part of coil 15 from the standpoint of number of turns. The input is connected approximately between two points which have no potential difference. In fact, the extent and direction of the potential difference will depend on the relative illumination of the two photoresistors 26 and 27 by the light beam from lamp 31. The torque induced in the disk 11 by light load plate 41 tends to make the disk move until the hole 32 is slightly off-center, so that either photoresistor 26 or photoresistor 27 receives a dominant part of the light beam. This reduces the resistance of that leg of the circuit causing a corresponding differential between the connections to the input circuit 43. This will in turn produce an output current from amplifier 16, of a direction (compared to the current in potential coil 12) to produce a counteracting torque on disk 11 through the influence of current coil 13. The disk 11 assumes a position in which the counteracting torque resulting from the differential illumination of the photoresistors 26 and 27 is just equal to the creeping torque caused by light load plate 41. As light load plate 41 is adjusted to eliminate creeping torque, the current through coils 13 and 33c is reduced to zero and the indicator 34 of meter 33 swings back to the zero position.

It will be observed that the input connections for amplifiers 16 are in Fig. 2 connected between the midpoints of two impedances across the same phase of source 14. Thus one of the leads is connected to the midpoint of a coil or inductor 46, while the other lead is connected as by tap or sliding contact 47, to the midpoint of a resistance system, including photoresistors 26 and 27.

In spite of the great differences between the circuit for Figs. 1 and 2, there is considerable fundamental similarity. In each instance a device for adjusting the inductive effect of the driving electromagnetic system on the disk is adjusted until the disk assumes a position at which the beam of light through its anti-creep hole is so divided between two photoresistors, controlling by their balance the input to an amplifier, that the output of the amplifier produces the desired standard condition in the energization of the electromagnetic system, the reaching of this desired standard condition being determined by a zero reading of a watt meter subjected to energization corresponding to that of the driving electromagnetic system being adjusted. Likewise in both figures, a maladjustment of the part being adjusted produces a torque on the disk until the disk assumes a position such that the output of the amplifier so energizes the driving magnetic system as to offset the maladjustment causing the torque, a movement of the disk beyond this position increasing the corrective nature of the energization so as to bring the disk back to this position.

Resistors 51 and 52 are merely load resistors; resistor 52 having high enough resistance to swamp or make negligible the inductance of current coils 13, thus allowing current to be approximately in phase with phase A—B. A bias resistor may be provided in Fig. 2 as at 28 in Fig. 1A.

*Combined circuit*

The circuit arrangements of Figs. 1 and 2 are both combined in Fig. 3, with switches, such as those of a gang switch, which can change the connections to provide either the Fig. 1 circuit or the Fig. 2 circuit. To a large extent the parts have been given the numbering corresponding to their numbering in Figs. 1 and 2. The major difference is the provision of the various switch contact arms 61, 62, 63, 64 and 65. When the various switch arms 61 to 65 are in the positions shown, the Fig. 2 circuit is provided for creep elimination. When the switch arms 61 to 65 are thrown to their opposite positions, usually by operation of a single gang switch, the system will be converted to the Fig. 1 circuit for the phasing operation.

*Sensitive low-power factor watt meter*

There is some doubt that conventional types of watt meters can be manufactured to give the desired sensitivity for use as the meter 33 shown in Fig. 1 where the meter must operate at a very low power factor, such as less than one-half of 1%, plus or minus. To meet this need, the watt meter illustrated in Fig. 4 has been devised.

Figure 4:
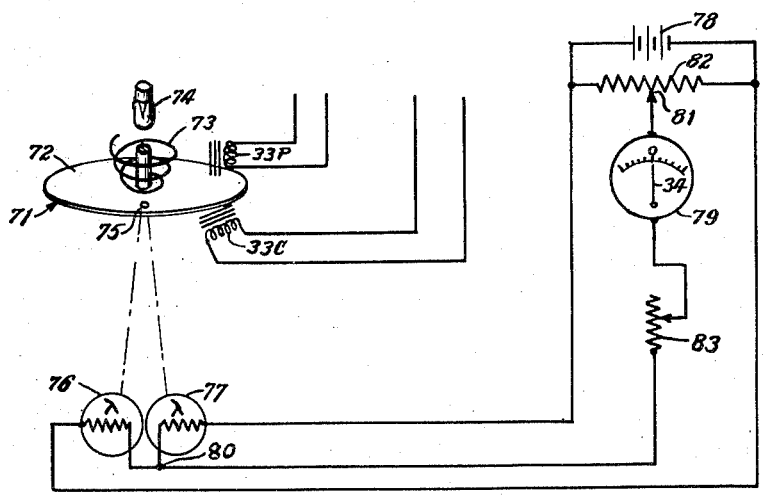
Fig. 4 is a schematic view showing an improved watt meter for low-power factor measurements, usable in Figs. 1 to 3.

The watt meter of Fig. 4 could also be termed a watt meter system, inasmuch as it includes considerably more, in a sense, than just the bare elements of a watt meter. The unit designated as 71 could be deemed a watt meter. This unit includes the disk 72 and potential and current magnets. The coils of these magnets have been numbered 33p and 33c, as in Figs. 1 to 3, since they would be connected as would those coils. A hairspring 73 is provided which yieldably urges the disk 72 toward a zero position. To overcome as much static bearing friction as possible, we have added electromagnetic shaking to the disk by driving it slightly in one direction and then the other at approximately 11 cycles per second through another set of coils.

The remainder of the apparatus in Fig. 4 may be considered the interpretive portion of the watt meter or watt meter system. Very minute shifts of the disks 72 are translated into substantial swings of the indicator needle or pointer 34. This can be accomplished quite satisfactorily by means of the interpretive or translating circuit of Fig. 4. In this circuit, a lamp 74 casts a beam through a small hole 75 in disk 72 toward photoresistors 76 and 77. These photoresistors form part of a typical Wheatstone bridge circuit, and closely resembles similar circuits in Figs. 1 to 3. In this instance, the legs of the circuit are connected across a battery 78, and a microammeter 79 is connected across the bridge points 80, 81 of the bridge circuit. The bridge point 81 is formed by a sliding tap on resistance 82 to provide a zero adjustment. An adjustable resistor 83 is provided directly in the bridging circuit with microammeter 79 to provide a range or sensitivity adjustment. A zero-center microammeter with 25 microamperes for full-scale deflection in either direction has been found suitable. The terms "bridge point" and "bridging circuit" may also be correspondingly used with reference to Figs. 1 to 3.

The illustrated form of watt meter or watt meter system is far more sensitive at power factors near zero than watt meters previously available.

Instead of using an aperture 75, a blade could cast a shadow or a divided beam which when centered would fall partly on both photoresistors. With a shifting of connections, the functioning would be the same. This would also be true in Figs. 1 to 3, but using the conventional anti-creep hole is more convenient in production meters.

With some loss of sensitivity and perhaps other loss, one photoresistor of each pair could be replaced by a resistance approximating the resistance of the retained tube half illuminated.

Just as no amplifier is used in Fig. 4, so the amplifiers of Figs. 1 to 3 could theoretically be omitted, at least if photoresistors should be found capable of direct control in such a circuit of the power required by at least one coil of the watthour meters.

*Comments on results*

From the foregoing, it is seen that an apparatus and method are provided for phasing a watthour meter in a very simple and reliable manner.

Another advantage of the invention is that it enables the meter calibrator to detect various other possible faults of a meter, such as excessive friction in the bearings, or excessive backlash in the adjustment devices. With a given meter design, there should be a uniformity in the responsiveness to adjustment of the light-load plate with the Fig. 2 connections and of changing the pigtail with the arrangements shown in Fig. 1. Any substantial departure from this uniformity is easily noticed by the calibrator due to need for making an excessive adjustment to accomplish a given correction. It is practical for a manufacturer to set standards as to responsiveness to adjustments so that any meter not meeting such standards is rejected. Of course, if there should be a sudden increase in the number of rejections, the test equipment would be suspect and should be checked.

It will be observed that the photoresistors 26 and 27, in cooperation with much of the remainder of the circuit, function as a means for applying to the disk a restraining influence proportional to its displacement from a zero position. Theoretically, some of the advantanges of this invention could be obtained by placing an entirely different restraining force on the disk which would increase with the displacement of the disk from an unmarked zero position and using the photoresistors 26 and 27 somewhat along the lines of the Fig. 4 circuit as a highly sensitive indicator for indicating minute movements of the disk from the zero position. Thus it is apparent that in Figs. 1 to 3 the photoresistors are important elements in performing both functions, namely the sensitive indicator function of determining slight movements of the disk from a zero position and the function of applying to the disk a restraining force proportional to its movement from the zero position. The combining of these functions is extremely advantageous in the production calibration of watthour meters because of the fact that it permits easy and reliable calibration with only the usual electrical connections to the meter being calibrated, in spite of the fact that the photoresistors are thereby enabled to perform both of their functions. Of course the restraining function referred to in this paragraph is not, by Figs. 1 to 3, really applied to the disk, but is applied indirectly in counteracting the force which would otherwise cause the disk displacement.

The usual electrical connections to the meter being calibrated would, of course, be the easily made connections of a test rack. A socket type meter would merely by "plugged in." The lamp 31 and photoresistors 26 and 27 are arranged to permit the meter to be interposed between them on the test rack, and if necessary may be on swinging brackets.

I claim:

1. Apparatus for calibrating a watthour meter of the type having a rotatable disk driven by a magnet system including a potential coil, a current coil, and an adjustable element for altering the inductive effect of at least one of said coils on the disk, including a lamp adapted to cast a beam of light through a portion of the disk, a pair of photoresistors between which the beam of light is shifted by movement of the disk, an amplifier having its output connected for energizing at least one of said coils and input connections for said amplifier connected to be controlled by the balance between said photoresistors to cause an output of the amplifier adapted to counteract the torque on the disk which tends to turn it in either direction from a null position balancing the illumination of the two photoresistors, and a standard meter energized correspondingly to the coils for determining when a desired standard condition of energization is attained.

2. Apparatus for calibrating a watthour meter of the type having a rotatable disk driven by a magnet system including a potential coil, a current coil, and an adjustable element for altering the inductive effect of at least one of said coils on the disk, including a lamp adapted to cast a beam of light through a portion of the disk, a pair of photoresistors between which the beam of light is shifted by movement of the disk, an amplifier having its output connected for energizing at least one of said coils and input connections for said amplifier connected to be controlled by the balance between said photoresistors to cause an output of the amplifier adapted to counteract the torque on the disk which tends to turn it in either direction from a null position balancing the illumination of the two photoresistors, and a standard meter energized correspondingly to the coils for determining when a desired standard condition of energization is attained, said standard meter having a center position indicating said condition and indicating by its direction of swing from its center position the direction of maladjustment of the element to be adjusted.

3. Apparatus for adjustment-testing of that type of watthour meter having a rotatable disk driven by a driving magnet system including a potential coil, a current coil and an adjustable element for altering the inductive effect of at least one of said coils on the disk: including an amplifier having an output connected to at least one of said coils, a pair of photoresistors, a lamp positioned to have a beam therefrom shifted between said photoresistors by movement of the disk, a source of power having two connections between which said photoresistors are connected in series, an input connection from the amplifier connected at a bridge point between the photoresistors and a companion input connector from the amplifier connected to a point which has potential differentials from both of said connections to said source of power comparable in ratio to the ratio of resistances between said bridge point and said connections to said source of power, whereby variations in balance between said two photoresistors will cause variations of input to said amplifier varying oppositely in regard to a characteristic of polarity and phase.

4. Apparatus for calibrating a watthour meter of the type having a rotatable disk driven by a magnet system including a potential coil, a current coil, and an adjustable element for altering the inductive effect of at least one of said coils on the disk, including a lamp adapted to cast a beam of light through a portion of the disk, a pair of photoresistors between which the beam of light is shifted by movement of the disk, an amplifier having its output connected for energizing at least one of said coils and input connections for said amplifier, one connected to an intermediate point between the photoresistors and the other connected to a source so related to a source across which the photoresistors are connected that a given balancing of the photoresistors will produce zero net energization of said input connections, the polarity of connections with different balancing of the photoresistors, and the amplifier characteristics being such as to cause an output of the amplifier adapted to counteract the torque on the disk which tends to turn it in either direction from a null position balancing the illumination of the two photoresistors, and a standard meter energized correspondingly to the coils for determining when a desired standard condition of energization is attained.

5. A meter system including a pair of photoresistors, a source of illumination directing a beam toward said pair of photoresistors, a pivoted element including means for shifting said beam between said photoresistors, actuating means including at least one coil for moving said pivoted element with a movement related to an electrical energization to be measured, a source of current having a pair of connections between which said photoresistors are connected in series, a bridging circuit connected at one end to a bridge point between the photoresistors and at the other end to a conductor connected to said pair of connections and connected to a point of said conductor having potential differences as to both of said pair of connections correlated to the respective resistances between said pair of connections and said bridge point present with a given balance of illumination on the photoresistors, whereby shifting said beam in opposite directions from the position giving said given balance of illumination will cause a departure in opposite directions from a normal condition in said bridging circuit, and means associated with said bridging circuit for indicating the direction and extent of the departure therein from said normal condition.

6. In the process of calibrating watthour meters of the type having a disk with an opening therethrough and driven by electromagnet means having a current coil and a potential coil, a shiftable light-load plate and an adjustable phasing coil, the steps of shining a light through said opening onto a pair of photoresistors while correspondingly energizing said coils and the coils of a standard center-zero watt meter, at least part of the energization being controlled by the balance of illumination between said photoresistors, with the control during one stage of operation controlling the amount and direction of the power of said energization and during a second stage of operation controlling the algebraic sign and magnitude of the power factor of said energization and in each instance providing an effective energization for exerting a torque on the disk in a direction opposite to the movement of the disk which causes a given departure from balance of illumination and sufficient to bring said disk to a stationary condition, and during the first stage shifting said light-load plate until said watt meter registers zero and during the second stage adjusting said phasing coil until said watt meter registers zero.

7. The method of calibrating a watthour meter of the type including a rotatable disk and driving means therefor including an electromagnet having a potential coil and a current coil, which includes the step of shining a beam of light toward a pair of photoresistors and utilizing said disk to control the direction of the light beam for movement of the beam between said photoresistors while energizing said coils and the coils of a standard watt meter by an energization controlled by the balance of illumination between said photoresistors with respect to a characteristic of power and power factor to produce a torque on the disk bringing it to a stationary condition, whereby the standard meter measures the value of the characteristic controlled which is required to bring the disk to a stationary condition.

8. The method of calibrating a watthour meter of the type including a rotatable disk and driving means therefor including an electromagnet having a potential coil and a current coil, which includes the step of shining a beam of light toward a pair of photoresistors and utilizing said disk to control the direction of the light beam for movement of the beam between said photoresistors while energizing said coils, restraining said disk against movement by a force proportional to the movement of the disk from a zero position and using the change of balance of the resistance of the photoresistors to produce an indication of the displacement of the disk from the zero position.

9. Calibration apparatus for watthour meters, including a pair of photoresistors and a lamp for directing a beam toward them arranged for interposing between the lamp and the photoresistors a watthour meter to be calibrated and of a type having a rotatable disk with an opening therethrough for shifting the beam between the photoresistors and driven by an electromagnet having current and potential coils, an amplifier having a pair of input connections and having output connections, one of the input connections being connected to a bridge point between said photoresistors with said photoresistors connected in series between a pair of wires of a three-wire three-phase source of power, an impedance also connected across said pair of wires and means for connecting said other input connection first to an intermediate point of said impedance and second to the third wire of said source of power, a wattmeter having current and potential coils, means for connecting said current coils first to be energized by a circuit including certain of said output connections and second to be energized by a circuit across said pair of wires, and means for connecting said potential coils first to be energized by a circuit across said pair of wires and second to be energized by a circuit including certain of said output connections.

10. The apparatus of claim 9 in which a gang switch is connected for making in one position all of the connections stated to be made first and for making in another position all of the connections stated to be made second.

11. Apparatus for calibrating watthour meters as to phasing, including a pair of photoresistors and a lamp for directing a beam of light toward them arranged for interposing between the lamp and the photoresistors a watthour meter to be calibrated and of a type having a rotatable disk with an opening therethrough for shifting the beam between the photoresistors and driven by electromagnet means having current and potential coils, an amplifier having a pair of input connections and a pair of output connections, a pair of wires comprising a source of power, a third wire which provides with each of the wires of said pair an additional source of power with both such additional sources displaced in phase, but in opposite direction from the phase of said pair, said photoresistors being connected in series across said pair of wires and said input connections being connected to bridge between a bridge point between said photoresistors and said third wire, means for connecting one of said coils to be energized by a circuit across said pair of wires and means for connecting the other of said coils to be energized by a circuit including said output connections, and means for indicating the phase relationship of the coil-energizing currents to each other.

12. Apparatus for calibrating watthour meters as to phasing, including a pair of photoresistors and a lamp for directing a beam of light toward them arranged for interposing between the lamp and the photoresistors a watthour meter to be calibrated and of a type having a rotatable disk with an opening therethrough for shifting the beam between the photoresistors and driven by electromagnet means having current and potential coils, means for supplying separate energizing currents to said coils with a phase relationship controlled by said photoresistors to pass through zero power factor with a given balance of illumination and with that direction of departure from zero tending to rotate the disk back to the position of said balance, and means for indicating the phase relationship of the coil-energizing currents to each other.

13. A meter system including a pair of resistors, at least one of which is a photoresistor, a source of illumination directing a beam toward said photoresistor, a pivoted element including means for shifting said beam to and away from said photoresistor, actuating means including at least one coil for moving said pivoted element with a movement related to an electrical energization to be measured, a source of current having a pair of connections between which said resistors are connected in series, a bridging circuit connected at one end to a bridge point between the resistors and at the other end to a conductor connected to said pair of connections and connected to a point of said conductor having potential differences as to both of said pair of connections correlated to the respective resistances between said pair of connections and said bridge point present with a given balancing degree of illumination on the photoresistor, whereby shifting said beam in opposite directions from the position giving said given degree of illumination will cause a departure in opposite directions from a normal condition in said bridging circuit, and means associated with said bridging circuit for indicating the direction and extent of the departure therein from said normal condition.

14. The method of calibrating a watthour meter of the type including a rotatable disk and driving means therefor including an electromagnet having a potential coil and a current coil, which includes the step of shining a beam of light toward a photoresistor and utilizing said disk to control the direction of the light beam for movement of the beam to and away from said photoresistor while energizing said coils and the coils of a standard watt meter by an energization controlled by the degree of illumination of said photoresistor with respect to a characteristic of power and power factor to produce a torque on the disk bringing it to a stationary condition, whereby the standard meter measures the value of the characteristic controlled which is required to bring the disk to a stationary condition.

No references cited.